July 9, 1929.

C. H. GOYNE

Re. 17,371

PRIMING SYSTEM FOR CENTRIFUGAL PUMPS

Original Filed Aug. 20, 1925 2 Sheets-Sheet 1

Inventor

Charles H. Goyne

By Watson E. Coleman

Attorney

July 9, 1929.
C. H. GOYNE
PRIMING SYSTEM FOR CENTRIFUGAL PUMPS
Re. 17,371
Original Filed Aug. 20, 1925 2 Sheets-Sheet 2
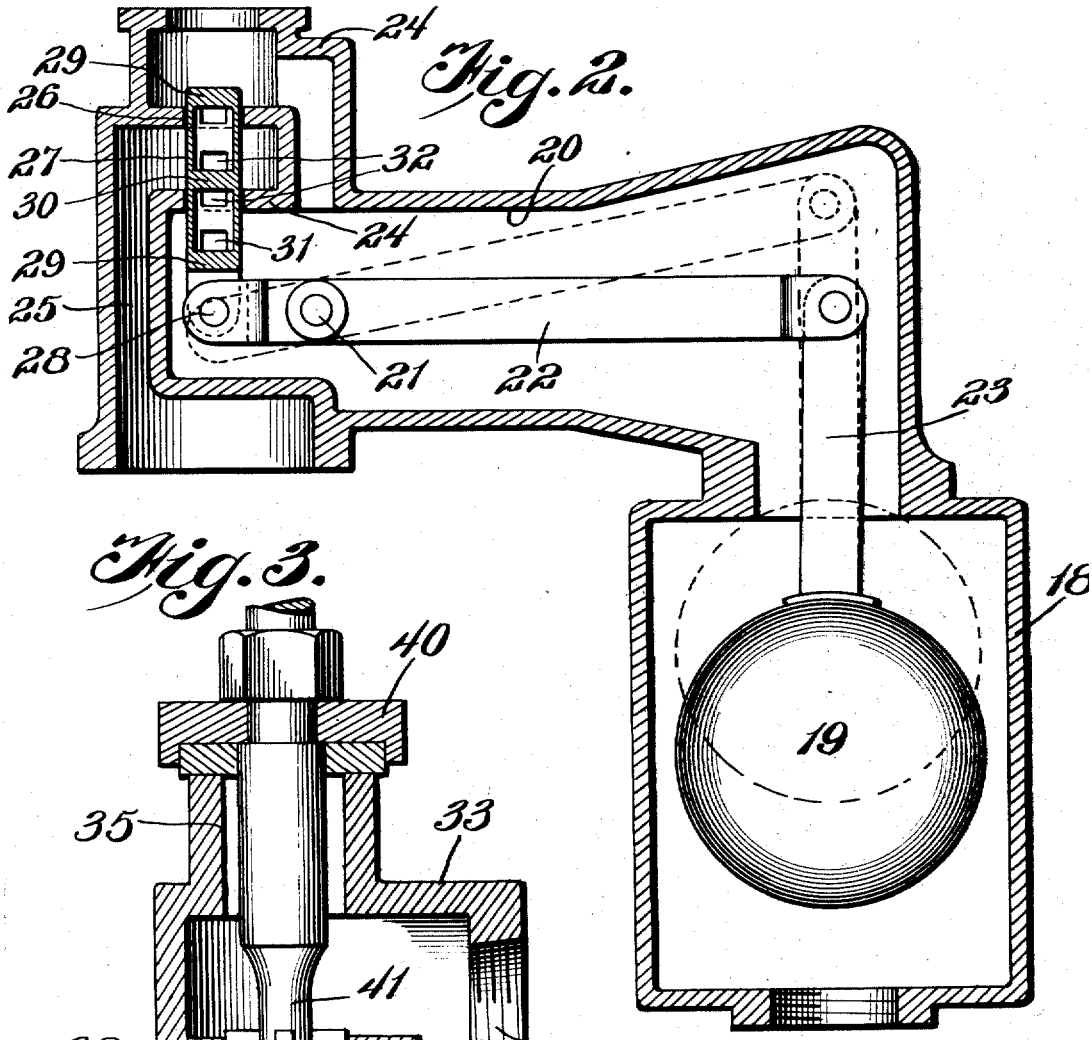
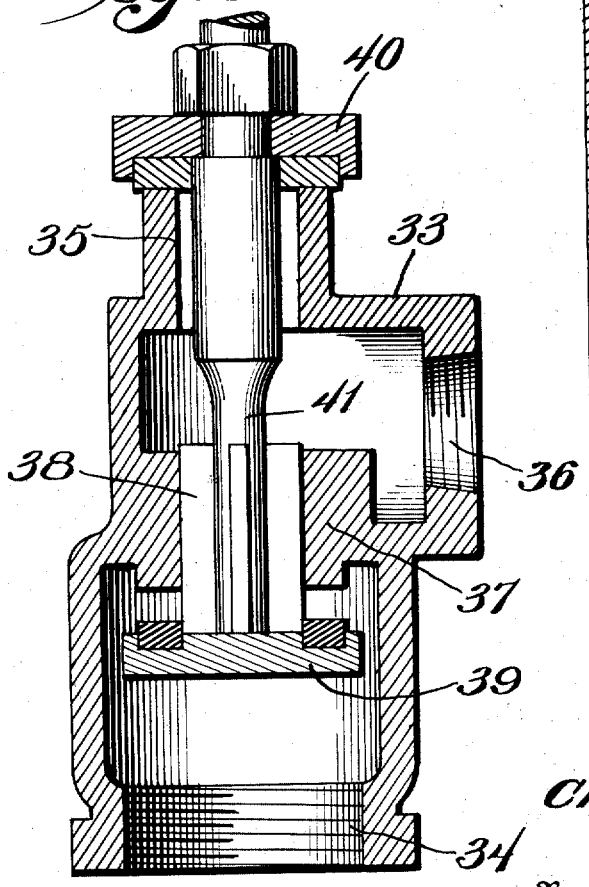
Inventor
Charles H. Goyne
By Watson E. Coleman
Attorney Reissued July 9, 1929. Re. 17,371

UNITED STATES PATENT OFFICE.

CHARLES H. GOYNE, OF ASHLAND, PENNSYLVANIA, ASSIGNOR TO GOYNE STEAM PUMP CO., OF ASHLAND, PENNSYLVANIA, A CORPORATION OF PENNSYLVANIA.

PRIMING SYSTEM FOR CENTRIFUGAL PUMPS.

Original No. 1,573,931, dated February 23, 1926, Serial No. 51,449, filed August 20, 1925. Application for reissue filed November 7, 1927. Serial No. 231,759.

This invention relates to priming systems for centrifugal pumps.

An important object of the invention is to provide a device of this character which will free the pump of all air and insure a proper priming thereof.

A further object of the invention is to provide in a device of this character, in which a priming pump is employed for exhausting air from the centrifugal to prime the same, a system which is free from openings and in which accordingly a head of water may be maintained in priming corresponding to the degree of vacuum produced by the priming pump, thereby eliminating surging of the water in the centrifugal and in connections between the centrifugal and priming pump.

A further object of the invention is to provide in a device of this character a novel and improved means for relieving the system as soon as the centrifugal is started and pressure produced thereby.

A still further object of the invention is to provide a float control means regulating the application of vacuum produced in the priming pump to the centrifugal so constructed that it is impossible for water to enter the priming pump during the priming operation or at any time thereafter.

A still further object of the invention is to provide means for relieving the priming column when the centrifugal is started to release all water contained therein and thereby prepare the system for a second priming operation.

These and other objects I attain by the construction shown in the accompanying drawings, wherein for the purpose of illustration is shown a preferred embodiment of my invention and wherein:—

Figure 2 is a vertical sectional view through the regulator;

Figure 3 is an enlarged vertical sectional view through the impulse valve;

Figures 1, 4:
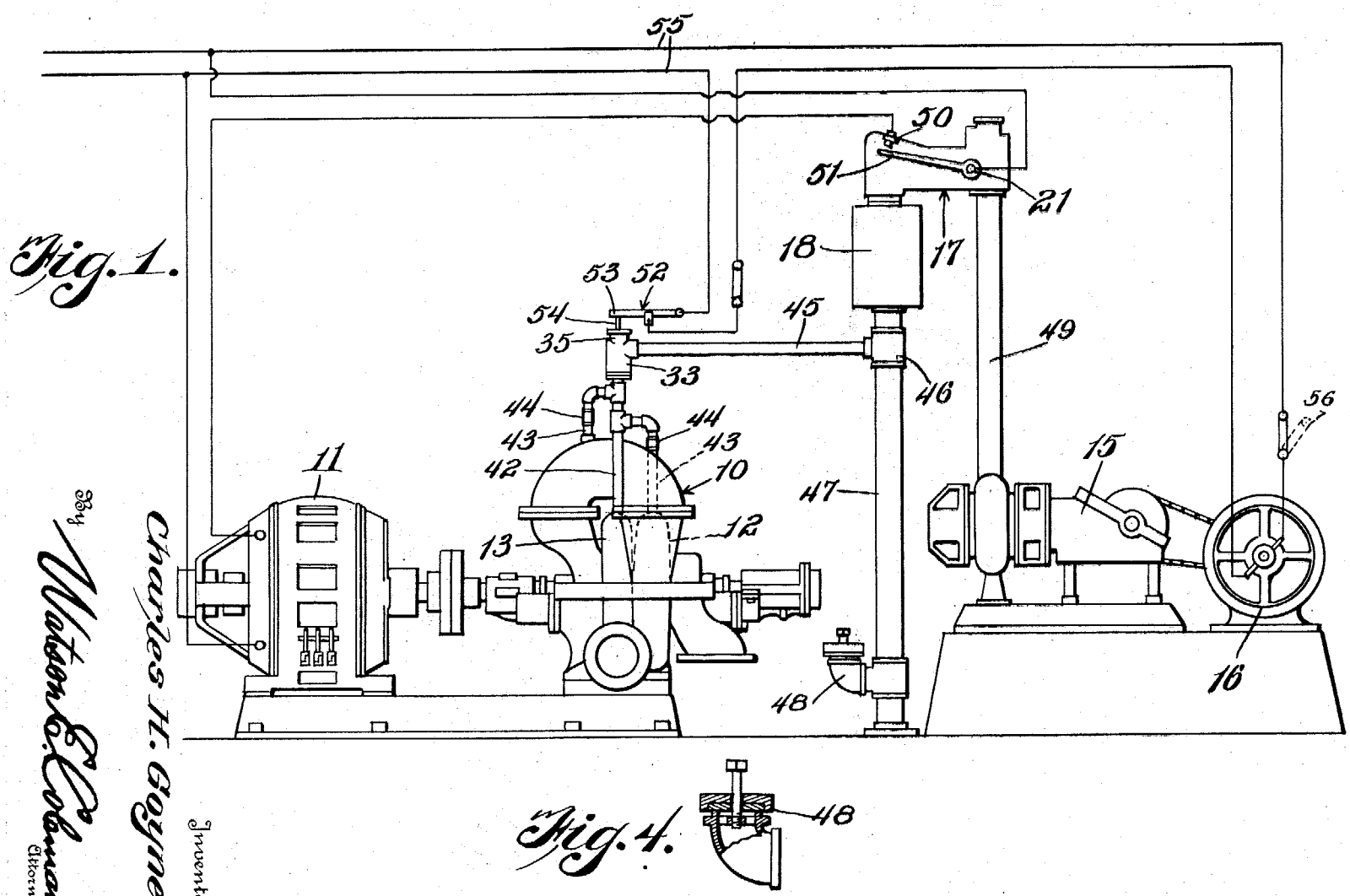
Figure 1 is a side elevation partially diagrammatic showing a pumping system constructed in accordance with my invention with the parts in the position which they occupy when the pump is primed and the centrifugal started but not yet under pressure.
Figure 4 is a detail view partially in section of the drain valve.

Referring now more particularly to the drawings, the numeral 10 generally designates a centrifugal pump of any suitable construction, this pump being driven by a motor 11 or other suitable prime mover. In the present instance, the pump is illustrated as a two stage pump of which the impeller chamber of the first stage is indicated at 12, the impeller casing of the second stage at 13 and the cross-over connection of the intake of the second stage and the exhaust of the first stage at 14. The numeral 15 designates an air pump driven by a motor 16, the pump being of any suitable character.

In accordance with my invention, I provide a regulator 17 including an intake and float chamber 18 within which operates a float 19. The outlet of the intake chamber communicates with a lever chamber 20 through the walls of which is directed a shaft 21 upon which is pivoted a lever 22, one end of which is connected by a link 23 with the float ball 19.

The lever chamber has projecting therein into above the opposite end of the lever 21 the walls 24 of an outlet passage 25. In alignment with the end of the lever, these walls have formed therein openings 26 in which operate a cylindrical valve element 27 pivotally connected to the opposite end of the lever, as at 28. This valve has its ends closed, as indicated at 29, and is provided with a central partition 30 spaced from the upper end wall 29 a distance equal to the spacing of the walls 24 of the outlet 25. Adjacent each end partition, the walls of the valve have formed therein openings 31 and upon opposite sides of the central partition have formed therein openings 32. When the valve is in the open position, the openings 31 and 32 at each side of the partition are arranged upon opposite sides of the walls 24, so that the lever chamber is in communication with the outlet and the inlet is likewise in communication with the outlet. When, however, the ball 19 rises within the chamber 18, the walls 29 and 30 align with the walls 24 and the outlet 25 is sealed from the lever chamber 20 and inlet and float chamber 18. I further provide what I term an impulse valve 33, this valve comprising a casing having main and secondary inlets 34 and 35 and an outlet 36. Between the inlet 34 and outlet 36 a valve seat 37 is arranged facing toward the inlet and this seat has operating therein the guide 38 of a valve 39 for coaction with the seat 37. The outer end of the casing at the inlet 35 is likewise formed as a seat, this seat facing oppositely to the seat 37 and coacting with a valve 40 carried by a continuation of the stem 41 of the valve 39. The stem is of such length that the two valves 39 and 40 cannot engage their seats simultaneously, one of the valves being unseated as the other of the valves is seated. Thus means are provided for placing either inlet 34 or 35 in communication with the outlet 36.

In making the connection for employing my pumping system, the inlet 34 of the valve 33 is connected with the high point of the impeller casing of the high pressure stage of the pump or in the present instance with the high point of the impeller casing 13 by a conduit 42. The remaining high points of the pump are connected with this conduit 42 by conduits 43, each having arranged therein a check valve 44, such a conduit 43 being supplied for each of the low pressure stages and for the cross-over connection 14. The outlet 36 of the valve 33 is connected with the intake port of the intake chamber 18 by a conduit 45. This conduit has preferably arranged therein a T 46 communicating with a vertical leg 47, the lower end of which has an outwardly opening check valve 48, the purpose of which will presently appear. The exhaust passage 25 of the regulator is connected with the intake of the pump 15 by a conduit 49.

In the use of the device, the pump 15 being in operation, a vacuum is created in the conduits 49, 45, 42 and since the check valves 44 open toward the conduit 42 in the conduits 43 and accordingly in all of the high points of the centrifugal, this vacuum causes water to rise into the centrifugal and conduit 45 until it engages with the float 19 and elevates the same sufficiently to cause closing of the valve 27. This immediately cuts off the vacuum of the pump 15 and the water ceases to rise but in event any air should leak about the stuffing boxes of the centrifugal and enter the same before the centrifugal is started and thus permit the water level to lower in the float chamber 18, the valve will be immediately opened and the suction brought into operation to restore the water to its proper level. Starting of the centrifugal is preferably but not necessarily accomplished by means of a switch, generally designated at 50, and operated from an arm 51 secured to the pivot shaft 21 of the lever 22. When the pump is started, pressure generated within the pump will act through the conduit 42 upon the valve 39, causing this valve to close and the valve 40 to open so that the conduit 45 is removed from communication with the centrifugal and placed in communication with the atmosphere. Since the conduit 42 is under pressure from the high stage, the pressure generated within this conduit will cause the check valves 44 to seat and prevent the pressure of this high stage from being transmitted to the lower stages. With the placing of the conduit 45 in communication with the atmosphere, the water within this conduit is permitted to drain back through the valve 40 or may drain through the leg 47 and valve 48, if this be provided. Such structure is preferably provided for it prevents passage of water over the centrifugal and its possible contact with a switch 52, the purpose of which is now to be described.

The switch 52 is an ordinary closed circuit jack switch, the movable arm 53 of which is arranged in the path of movement of a continuation 54 of the stem 41 above the upper end of the valve 40. When the valve is in its raised position and disengaged from its seat, this continuation operatively engages the arm 53 to open the circuit of the switch 52. This switch is arranged in one side of a motor circuit 55 of the motor 16 and accordingly this motor circuit is broken when the valve 40 is opened and the pump 15 is brought to a stop. This motor circuit 55 preferably further includes a hand operated switch 56 by means of which the circuit may be manually broken. It will be obvious that the circuits referred to have been diagrammatically illustrated and that, of course, the switch 51 would not serve to maintain the motor circuit after the priming line had been drained. Means for accomplishing this function are, however, old and well known and it will accordingly be well understood how the same will be applied. An example of a method of maintaining the circuit of the centrifugal pump motor which might be employed may be found in the patent to Otto Haentjens, granted October 28, 1924, No. 1,513,705. I do not, however, wish to be understood as limiting myself to the use of such a means for maintaining the circuit.

It will be seen that with the construction employed, it is not possible for any of the priming water to reach the pump 15 and this is an important feature of the construction for the reason that devices of this character are usually employed in pumping the sump of mines and accordingly the water being handled is very dirty and capable of causing considerable damage to a small pump of this character. It will furthermore be obvious that a perfect prime of the centrifugal will be maintained at all times when the pump 15 is in operation and that the system employed provides an efficient drain for removing the priming water after each priming operation to prepare the system for a further operation. Attention is directed to the fact that by reason of the construction and mounting of the valve 27, this valve is balanced, as regards suction applied thereto from the pump 15 and will accordingly be unaffected in any way whatever by this suction. I am aware that systems somewhat resembling the system hereinbefore set forth have been employed but in all of these systems with which I am familiar, the valve corresponding in purpose to the valve 27 is so constructed or arranged that it has unbalanced communication with the source of suction and accordingly will be held against the seat once it is seated as long as the suction pump continues to run. For this reason, it is impossible for the float operated valve to act in devices of the character mentioned to relieve the suction of the priming pump after the centrifugal has been started and in event the priming pump continues in operation. It will be noted that in the construction in accordance with my invention, after the portion of the priming connection between the valve 33 and regulator 17 has been relieved through the valve 40, the valve 27 will be opened by the discharge of water from this portion of the connection and since this portion of the connection is then opened to the atmosphere, the pump 15 will be relieved. The valve 27, therefore, serves after the operation of the impulse valve 33 as an unloader valve. This valve is never subjected to the pressure of the discharge from the centrifugal and is accordingly freely operable at all times.

The construction hereinbefore set forth is obviously capable of a certain range of change and modification without materially departing from the spirit of the invention and I accordingly do not limit myself to the specific structure except as hereinafter claimed.

I claim:—

1. In a priming system for centrifugals and in combination with a centrifugal, a priming pump therefor, a connection between a high point of the centrifugal and the priming pump including a valve automatically segregating the centrifugal and priming pump when the centrifugal is primed and before it is started and means in said connection between the centrifugal and valve automatically segregating the centrifugal and valve when the centrifugal is started and placing that portion of the connection between said means and valve in communication with the atmosphere.

2. In a priming system for centrifugals and in combination with a centrifugal, a priming pump therefor, a connection between a high point of the centrifugal and the priming pump including a valve automatically segregating the centrifugal and priming pump when the centrifugal is primed and before it is started and means in said connection between the centrifugal and valve automatically segregating the centrifugal and valve when the centrifugal is started and placing that portion of the connection between said means and valve in comunication with the atmosphere and rendering the priming pump inoperative.

3. In a priming system for centrifugals and in combination with a centrifugal, a priming pump therefor, a connection between a high point of the centrifugal and the priming pump including a valve automatically segregating the centrifugal and priming pump when the centrifugal is primed and before it is started, means in said connection between the centrifugal and valve automatically segregating the centrifugal and valve when the centrifugal is started and placing that portion of the connection between said means and valve in communication with the atmosphere and means operative to drain said portion of the connection when placed in communication with the atmosphere, the first named valve operating as an unloader valve for the priming pump when said portion of the connection is drained.

4. In a pump system, a centrifugal pump, a priming pump therefor, a balanced float operated valve arranged in the connection between said pumps and an impulse valve arranged in said connection between the float operated valve and the centrifugal pump and operated by pressure generated by the centrifugal pump to close communication between the centrifugal pump and the float operated valve and to place the portion of the connection between the float and impulse valves into communication with the atmosphere and means draining said portion of the connection when placed in communication with the atmosphere.

5. In a pump system, a centrifugal pump, a priming pump therefor, a balanced float operated valve arranged in the connection between said pumps and an impulse valve arranged in said connection between the float operated valve and the centrifugal pump and operated by pressure generated by the centrifugal pump to close communication between the centrifugal pump and the float operated valve and to place the portion of the connection between the float and impulse valves into communication with the atmosphere and means draining said portion of the connection when placed in communication with the atmosphere, said float operated valve opening to place the priming pump in communication with said portion of the connection when said portion of the connection is drained to thereby relieve the priming pump upon continued operation thereof.

6. In a priming system for centrifugals and in combination with a centrifugal, a priming pump therefor, a connection between a high point of the centrifugal and the priming pump including a valve automatically segregating the centrifugal and priming pump when the centrifugal is primed and before it is started, means in said connection between the centrifugal and valve automatically segregating the centrifugal and valve when the centrifugal is started comprising a casing having an inlet communicating with the high point of the centrifugal, a second inlet communicating with the atmosphere, an outlet communicating with the first named valve and valves for controlling said inlets connected for simultaneous operation.

7. In a pump system, a centrifugal pump, a priming pump therefor, a valve arranged in the connection between said pumps, a float for operating the valve, an impulse valve arranged in said connection between the first named valve and the centrifugal pump automatically closing as the centrifugal comes into operation, a motor for operating the priming pump, a circuit for the motor including a normally closed switch and means operated by the closing of the impulse valve for opening said switch.

8. In a pump system, a centrifugal pump, a priming line connected to the pump casing, a float-operated valve in said line for automatically closing the same when the pump casing is primed, together with a second valve in said line automatically closed by pressure from the pump when the latter is in operation and means associated therewith for opening to atmosphere the portion of said priming line between said valves.

9. In a pump system, a centrifugal pump, a priming line connected to the pump casing, a float-operated valve in said line for automatically closing the same when the pump is primed, together with a second valve in said line automatically closed by pressure from the pump when the latter is in operation, and means associated therewith for draining the portion of the line between said valves when the pump is in operation.

10. In a pump system, a centrifugal pump, a priming pump therefor, a priming line connecting the pump casing and the priming pump, float-controlled means in said line for automatically closing the same against the passage of liquid from the centrifugal pump to the priming pump when the centrifugal pump casing is primed, a valve in said priming line between said means and the centrifugal pump closed by pressure from the pump when the latter is in operation and means operated thereby for opening to the atmosphere the portion of said priming line between said valve and said means.

11. In a pump system, a centrifugal pump, a priming pump therefor, a priming line connecting the pump casing and the priming pump, float-controlled means in said line for automatically closing the same against the passage of liquid from the centrifugal pump to the priming pump when the centrifugal pump casing is primed, a valve in said priming line between said means and the centrifugal pump closed by pressure from the pump when the latter is in operation and means operated thereby for draining the portion of the line between said valve and the first named valve when the centrifugal pump is in operation.

12. In a pump system, a centrifugal pump, a conduit opening thereto for the reception of fluid from the pump casing during priming of the pump, a normally open valve in said conduit adapted to be closed by pressure generated when the pump is started, a drain port for said conduit beyond said valve from the pump and a normally closed valve controlling said port and adapted to be opened by pressure generated by the pump when started.

13. In a pump system, a centrifugal pump, a conduit opening thereto for the reception of fluid from the pump casing during priming of the pump, a normally open valve in said conduit adapted to be closed by pressure generated when the pump is started, a drain port for said conduit beyond said valve from the pump, a normally closed valve controlling said port, and a connection between said valves whereby the last named valve opens as the first named valve closes.

14. In a pump system, a centrifugal pump, a conduit for the reception of fluid from the pump casing during priming of the pump, a valve casing having a port communicating with the pump casing, a second port communicating with the atmosphere and a third port communicating with the conduit, a normally open valve controlling the passage of fluid from the first port through the third port, a normally closed valve controlling passage of fluid from the third through the second port or vice versa, said valves moving oppositely to engage their seats and being connected for simultaneous movement, the first named valve being subject to and closing under the influence of pressure generated in the pump casing when the pump is started.

15. In a pump system, a centrifugal pump, a fill conduit for the reception of fluid from the pump casing, a drainage passage for the conduit, and a valve device alternately admitting fluid from the pump casing to the fill conduit or opening the drainage passage, said valve device being subject to automatic displacement by pressure from the pump discharge to open the drainage port.

In testimony whereof I hereunto affix my signature.

CHAS. H. GOYNE.